United States Patent [19]

Tachikawa et al.

[11] Patent Number: 5,037,908

[45] Date of Patent: Aug. 6, 1991

[54] PROCESS FOR POLYMERIZATION OF BUTENE-1

[75] Inventors: Mamoru Tachikawa; Satoshi Ueki; Masato Sakuma; Makoto Miyazaki, all of Saitama, Japan

[73] Assignee: Toa Nenryo Kogyo K.K., Tokyo, Japan

[21] Appl. No.: 811,541

[22] Filed: Dec. 19, 1985

[30] Foreign Application Priority Data

Dec. 26, 1984 [JP] Japan .................. 59-273119

[51] Int. Cl.$^5$ .................. C08F 4/651; C08F 4/64; C08F 10/08

[52] U.S. Cl. .................. 526/97; 502/120; 502/118; 526/121; 526/124; 526/125; 526/138; 526/129; 526/132; 526/159; 526/903; 526/348.6

[58] Field of Search .................. 526/82, 84, 97, 121, 526/124, 125, 138, 159, 903, 129, 132

[56] References Cited

U.S. PATENT DOCUMENTS

| | | | |
|---|---|---|---|
| 4,208,497 | 6/1980 | Bronstert et al. | 526/138 |
| 4,282,341 | 8/1981 | Klaerner et al. | 526/138 |
| 4,308,361 | 12/1981 | Fujii et al. | 526/82 |
| 4,326,048 | 4/1982 | Stevens et al. | 526/84 |
| 4,330,652 | 5/1982 | Gilbert et al. | 526/138 |
| 4,334,047 | 6/1982 | Rogan et al. | 526/138 |
| 4,526,941 | 7/1985 | Sakurai et al. | 526/129 |
| 4,552,858 | 11/1985 | Imai et al. | 526/124 |
| 4,569,975 | 2/1986 | Esneault et al. | |

FOREIGN PATENT DOCUMENTS 30681 3/1978 Japan .
123607 9/1980 Japan .

OTHER PUBLICATIONS

Boor, Ziegler-Natta Catalysts and Polymerization, Academic Press, N.Y. (1979), pp. xii, 602, 604-608.
Boor, Journal of Polymer Science, Part A, vol. 3, pp. 995-1011 (1965).

Primary Examiner—Edward J. Smith
Attorney, Agent, or Firm—M. B. Kurtzman

[57] ABSTRACT

An improved process for polymerizing butene-1 in the presence of a polymerization catalyst composed of (a) a catalyst component containing titanium and halogen as essential constituents and (b) an organometallic compound, wherein the improvement comprises bringing said catalyst component into contact with an activity inhibitor when said catalyst component is activated or after said catalyst component has been activated with said organometallic compound, and subsequently polymerizing butene-1.

6 Claims, No Drawings

PROCESS FOR POLYMERIZATION OF BUTENE-1

DETAILED DESCRIPTION OF THE INVENTION

1. Field of Industrial Application

The present invention relates to a process for the polymerization of butene-1 and, more particularly, to a slurry process for polymerizing butene-1 with a Ziegler-Natta catalyst.

2. Prior Art

There are many known processes for polymerizing butene-1 with a Ziegler-Natta catalyst. Some of them are embraced in the polymerization process of olefins, and others are specialized in that of butene-1.

Where the polymerization is performed in the presence of a titanium-based high-activity catalyst, the bulk density of the resulting polymer is increased and the particle properties of the resulting polymer are improved by the following methods. (1) alpha-olefin other than butene-1 is preliminarily polymerized. (Japanese Patent Laid-open No. 123607/1980) (2) A portion of butene-1 is polymerized at low temperatures in the first stage of the dual-stage polymerization process, and the remainder of butene-1 is polymerized at elevated temperatures in the second stage. (Japanese Patent Publication No. 8758/1975 and Japanese Patent Laid-open No. 30681/1978).

PROBLEMS TO BE SOLVED BY THE INVENTION

The present invention is intended to overcome the disadvantage involved in the conventional slurry polymerization process for the production of polybutene-1. The disadvantage is that the bulk density of the resulting polymer is decreased and the properties of polymer particle is degraded when a high-activity catalyst is used.

MEANS TO SOLVE THE PROBLEMS

SUMMARY OF THE INVENTION

The present inventors carried out a series of researches to solve the problems based on the assumption that a high-activity polymerization catalyst so radically generates reaction heat because of its high initial activity, and this reaction heat melts the polymer particles having just been formed, prior to being diffused to the monomers, that which gives low density and degraded polymer particles.

As the result, it was found that if polymerization of butene-1 is performed using a polymerization catalyst, with its catalytic activity temporarily inhibited, a polymer of butene-1 having a high bulk density is obtained in high yields. The present invention was completed based on this finding.

Accordingly, the gist of the invention resides in an improved process for polymerizing butene-1 in the presence of a polymerization catalyst composed of (a) a catalyst component containing titanium and halogen as essential constituents and (b) an organometallic compound, wherein the improvement comprises bringing said catalyst component into contact with an activity inhibitor when said catalyst component is activated or after said catalyst component has been activated with said organometallic compound, and subsequently polymerizing butene-1.

POLYMERIZATION CATALYST

The polymerization catalyst used in this invention is composed of (a) a catalyst component containing titanium and halogen as essential constituents and (b) an organometallic compound.

(a) Catalyst component

The catalyst component contains titanium and halogen as essential constituents, and there are many known such catalyst components. Typical ones are titanium trihalide (e.g., titanium trichloride) and titanium tetrahalide (e.g., titanium tetrachloride).

These titanium halides may be used as such for polymerization; but in this invention where high catalytic activity is required, the catalyst component of high activity is produced by the following processes.

(i) By reducing titanium tetrachloride with hydrogen, aluminum, or an organometallic compound an organic compound of a metal belonging to Groups I to III of the Periodic Table. It includes, for example, organic compounds of lithium, magnesium, calcium, zinc, and aluminum. Organoaluminum compounds are preferred among them.

The organoaluminum compound that can be used is one which is represented by the formula $R_nAlX_{3-n}$ (where R is a $C_1$-$C_{18}$ alkyl group or a $C_6$-$C_{12}$ aryl group; X is a halogen atom, a $C_1$-$C_{12}$ alkoxy group, or a hydrogen atom; and n is a number in the range of $1 \leq n \leq 3$) to give titanium trichloride or a complex compound thereof, and treating it with an activating agent such as electron donor, halogen element, and halogen-containing compound.

The electron donor compound includes, for example, alcohols, ethers, carboxylic esters, lactones, amines, carboxylic acid halides, carboxylic acid anhydrides, carboxylic amides, nitriles, ketones, aldehydes, thioethers, and organic phosphorus-containing compounds.

Examples of the alcohols include methanol, ethanol, propanol, butanol, hexanol, octanol, cyclohexanol, phenol, cresol, catechol, ethylene glycol, 2-chloroethanol, 1-chloro-2-propanol, and 4-chloro(m,o)-cresol. Examples of the ethers include diethyl ether, dipropyl ether, diisopropyl ether, dibutyl ether, diisobutyl ether, diisoamyl ether, dihexyl ether, di-2-ethylhexyl ether, anisole, and tetrahydrofuran. Examples of the carboxylic esters include ethyl acetate, butyl butyrate, propyl pivalate, ethyl acrylate, ethyl methacrylate, diethyl succinate, butyl adipate, diethyl maleate, ethyl benzoate, methyl p-toluylate, ethyl p-anisate, monobutyl phthalate, dibutyl phthalate, and triethyl trimellitate. Examples of the lactones include gamma-butyrolactone and delta-valerolactone. Examples of the amines include methylamine, ethylamine, diethylamine, tributylamine, aniline, and tetramethylenediamine. Examples of the carboxylic acid halides include acetic acid chloride, butyric acid bromide, acrylic acid bromide, methacrylic acid chloride, sebacic acid bromide, maleic acid chloride, benzoyl chloride, p-toluic acid chloride, p-anisic acid chloride, phthalic acid dichloride, maleic acid methyl chloride, and phthalic acid butyl chloride. Examples of the carboxylic acid anhydrides include acetic anhydride, maleic anhydride, benzoic anhydride, and phthalic anhydride. Examples of the carboxylic acid amides include acetamide, benzamide, and toluamide. Examples of the nitriles include acetonitrile, benzonitrile, and tolunitrile. Examples of the ketones include acetone, methyl ethyl ketone, methyl isobutyl ketone, benzophenone, and acetophenone. Examples of the aldehydes include acetaldehyde, propionaldehyde, hexylaldehyde, benzaldehyde, and naphthoaldehyde. Examples of the organic phosphorus-containing compounds include trimethyl phosphite, triphenyl phosphite, diphenylethyl phosphonate, diethylbenzyl phosphonate, tributyl phosphine, and triphenyl phosphine. Examples of the thioethers include diethyl thioether, dibutyl thioether, diphenyl thioether, and ethyl phenyl thioether.

The halogen element includes, for example, chlorine, iodine, and bromine.

The halogen-containing compound includes, for example, hydrogen halide such as hydrogen chloride and hydrogen bromide; halogenated hydrocarbon such as monochloroethane, dichloroethane, trichloroethane, tetrachloroethane, hexachloroethane, dichloropropane, tetrachloropropane, hexachloropropane, dichlorobutane, trichloropentane, and dichlorobenzene; halides of metallic or non-metallic elements such as $TiCl_4$, $SiCl_4$, $SnCl_4$, $BCl_3$, $AlCl_3$, $SbCl_3$, $BI_3$, $PCl_3$, $PCl_5$, and $HSiCl_3$; and oxyhalides of non-metallic elements such as $SO_2Cl_2$, $SOCl_2$, $NOCl$, and $POCl_3$.

These activating agents may be used alone or in combination with one another. Where two or more kinds of activating agents are used, they may be used simultaneously or consecutively. The treatment with the activating agent may be accomplished in the presence of an inert solvent such as hexane, heptane, octane, cyclohexane, benzene, toluene, and xylene.

The activation by the activating agent is accomplished by treating titanium trichloride or a complex compound thereof:

(1) with an electron donor compound in the presence or absence of a halogen element and then with a halogen compound of metallic or non-metallic element.
(2) with a halogen compound of metallic or non-metallic element in the presence of a halogen element.
(3) with an electron donor compound and then with a halogen compound of metallic or non-metallic element and a complex compound of an electron donor compound.
(4) with an electron donor compound and then with a halogenated hydrocarbon.
(5) with a halogenated hydrocarbon in the presence of an electron donor compound.
(6) or by treating the treated product in (4) or (5) with a halogen compound of metallic or non-metallic element.

(ii) By contacting magnesium metal or a magnesium compound and a titanium halide compound with an activating agent such as electron donor compound, halogen element, halogen-containing compound, or organoaluminum compound.

The magnesium compound is represented by the formula $MgR^1{}_nR^2{}_{2-n}$, where $R^1$ and $R^2$ are the same or different hydrocarbon groups, $OR^3$ groups (where $R^3$ is a hydrocarbon group which is the same as or different from $R^1$ and $R^2$), OH groups, or halogen atoms; and $0 \leq n \leq 2$.

Examples of the magnesium compound include magnesium halides such as $MgCl_2$, $MgBr_2$, and $MgI_2$; dihydrocarbyl magnesium such as $Mg(CH_3)_2$, $Mg(C_2H_5)_2$, $Mg(C_3H_7)_2$, $Mg(C_4H_9)_2$, $Mg(C_2H_5)(C_4H_9)$, $Mg(C_6H_{13})_2$, $Mg(C_8H_{17})_2$, and $Mg(C_6H_5)_2$; dialkoxy magnesium such as $Mg(OCH_3)_2$, $Mg(OC_2H_5)_2$, $Mg(OC_3H_7)_2$, $Mg(OC_4H_9)_2$, $Mg(OC_6H_{13})_2$, $Mg(OC_8H_{17})_2$, and $Mg(OC_6H_5)_2$; and $Mg(OH)Cl$. The magnesium compound may also be used in the form of a mixture with an organic compound of aluminum, boron, beryllium, or zinc, or in the form of a complex with a metal or compound of aluminum, boron, beryllium, or zinc.

Examples of the titanium halide compound include $TiCl_4$, $TiCl_3$, $Ti(OC_2H_5)Cl_3$, $Ti(OC_4H_9)Cl_3$, $Ti(OC_2H_5)_2Cl_2$, and $Ti(OC_6H_5)_2Cl_2$.

The electron donor compound, halogen element, and halogen-containing compound are the same as those used in process (i) mentioned above.

Examples of the organoaluminum compound include dihydrocarbyl aluminum halide such as diethyl aluminum chloride, dibutyl aluminum chloride, diethyl aluminum bromide, dibutyl aluminum bromide, dihexyl aluminum chloride, diphenyl aluminum chloride; and hydrocarbyl aluminum dihalide such as methyl aluminum dichloride, ethyl aluminum dichloride, propyl aluminum dichloride, butyl aluminum dichloride, phenyl aluminum dichloride, ethyl aluminum dibromide, and butyl aluminum dibromide.

These activating agents may be used alone or in combination with one another. Where two or more kinds of activating agents are used, they may be used simultaneously or consecutively. The contacting of magnesium metal or a magnesium compound and a titanium halide compound with the activating agent may be accomplished by mechanically pulverizing or mixing in the presence or absence of an inert solvent such as hydrocarbon used in the above-mentioned step (i). The contacting may be accomplished in any order and in any method as described below.

(1) A magnesium compound is contacted with an electron donor compound, and the resulting contact product is contacted with a titanium halide compound.
(2) A magnesium compound is contacted with a halogen-containing compound, and the resulting contact product is contacted with an electron donor compound (this step may be omitted), and finally the resulting contact product is contacted with a titanium halide compound.
(3) A magnesium compound is contacted with an electron donor compound, and the resulting contact product is contacted with an organoaluminum compound, halogen element, or halogen-containing compound, and finally the resulting contact product is contacted with a titanium halide compound.
(4) The catalyst component obtained in (2) or (3) is contacted with a halogen-containing compound or organoaluminum compound.
(5) Magnesium metal is contacted with a halogen element, halogen-containing compound and/or electron donor compound, and the resulting contact product is contacted with an electron donor compound (this step may be omitted), and finally the resulting contact product is contacted with a titanium halide compound.

(iii) By contacting magnesium metal or a magnesium compound and a titanium halide compound with an activating agent such as electron donor compound, halogen element, halogen-containing compound, or organoaluminum compound in the presence of a metal oxide.

The metal oxide includes, for example, $B_2O_3$, $MgO$, $Al_2O_3$, $SiO_2$, $CaO$, $TiO_2$, $ZnO$, $ZrO_2$, $SnO_2$, $BaO$, and $ThO_2$. A metal oxide complex such as $SiO_2$-$MgO$, $SiO_2$-$Al_2O_3$, and $SiO_2$-$TiO_2$ can also be used.

The contacting of a metal oxide, metallic magnesium or a magnesium compound, a titanium halide compound, and an activating agent may be accomplished by mechanically pulverizing or mixing in the presence or absence of an inert solvent such as the above-mentioned hydrocarbon. The contacting may be accomplished in any order; but, preferably, magnesium compound is previously contacted with a metal oxide and then treated in the order of method (ii).

(b) Organometallic compound

The organometallic compound that can be used in this invention is an organic compound of a metal belonging to Groups I to III of the Periodic Table. It includes, for example, organic compounds of lithium, magnesium, calcium, zinc, and aluminum. Organoaluminum compounds are preferred among them.

The organoaluminum compound that can be used is one which is represented by the formula $R_nAlX_{3-n}$ (where R is a $C_1$-$C_{18}$ alkyl group or a $C_6$-$C_{12}$ aryl group; X is a halogen atom, a $C_1$-$C_{12}$ alkoxy group, or a hydrogen atom; and n is a number in the range of $1 \leq n \leq 3$). Examples of this compound include trimethyl aluminum, triethyl aluminum, tripropyl aluminum, triisobutyl aluminum, trihexyl aluminum, dimethyl aluminum chloride, diethyl aluminum chloride, diethyl aluminum bromide, diisobutyl aluminum chloride, methyl aluminum dichloride, ethyl aluminum dichloride, ethyl aluminum dibromide, isobutyl aluminum dichloride, ethyl aluminum sesquichloride, diethyl aluminum methoxide, diethyl aluminum phenoxide, diethyl aluminum hydride, and diisobutyl aluminum hydride.

More than two kinds of organometallic compounds can be used, and they can be used after being contacted with the electron donor compound that is used in the preparation of the catalyst component.

ACTIVITY INHIBITOR

The activity inhibitor includes, for example, inorganic gases such as carbon monoxide, carbon dioxide, and sulfur dioxide; allene compounds such as propadiene, 1,2-butadiene, and 1,2-pentadiene; non-conjugated compounds such as 1,3-butadiene and isoprene; and alicyclic conjugated diene compounds such as norbonadiene and 1,5-cyclooctadiene.

The activity inhibitor temporarily inactivates a part of all of the active sites on the polymerization catalyst. The activity of the inhibited catalyst is gradually restored in the polymerization reactor. The restoration of the activity can be controlled by properly selecting the kind and amount of the activity inhibitor. The activity inhibitor may be diluted with an inert fluid such as nitrogen and paraffin.

Usually the activity inhibitor is used when the catalyst component is activated with an organometallic compound or after the catalyst component has been activated with an organometallic compound.

According to this invention, it is important to control the amount of the activity inhibitor. Usually it is 0.0001 to 0.01 gram-mol, preferably 0.0002 to 0.001 gram-mol, for 1 gram-atom of titanium in the catalyst component, in the case where the catalyst component is prepared by the above-mentioned method (i). Or, it is 0.001 to 1 gram-mol, preferably 0.005 to 0.5 gram-mol, in the case where the catalyst component is prepared by the above-mentioned method (ii) or (iii). The amount varies depending on the kind and amount of the organometallic compound as a constituent of the polymerization catalyst, and on the amount of hydrogen.

PROCESS FOR POLYMERIZATION

The polymerization of butene-1 can be accomplished by the known slurry polymerization process. According to this process, the polymerization catalyst which has been treated with an activity inhibitor is fed to the polymerization reactor, where the main polymerization may be started immediately, or the preliminary polymerization may be previously started. The preliminary polymerization and the main polymerization may be performed in the same reactor or in the different reactors. The polymerization may be performed batchwise or continuously. Where a solvent is used, an inert hydrocarbon, particularly $C_6$-$C_8$ saturated hydrocarbon, is preferable. The preferred polymerization temperature is room temperature to 45° C. For the molecular weight modification of the polymer, hydrogen may be present in the reactor. The scope of this invention covers not only the homopolymerization of butene-1 but also the copolymerization of butene-1 with a small amount, 10% or less preferably, of other olefins such as ethylene, propylene, 1-hexene, and 4-methyl-1-pentene.

EFFECT OF THE INVENTION

According to this invention, the polymerization of butene-1 is performed by using a titanium-based high-activity polymerization catalyst and the catalyst is previously treated with an activity inhibitor, whereby the bulk density of the resulting polymer is increased and the particle properties of the resulting polymer are improved. In addition, according to this invention, the conventional preliminary polymerization step or the dual-stage polymerization process may be obviated or simplified.

EXAMPLES

The invention is illustrated with the following examples, in which percent is by weight.

The bulk density of the resulting polybutene-1 was measured according to ASTM D1895-69, method A.

EXAMPLE 1

Preparation of catalyst component A

In a 2-liter flask equipped with a stirrer and placed in a water bath at 0° C. were placed 700 ml of purified heptane and 250 ml of titanium tetrachloride. While keeping the reactants at 0° C., a mixture of 15 ml of DEAC, diethyl aluminum chloride, (equivalent to 1.1 mol for 1 mol of titanium tetrachloride), 117 ml of EADC; ethyl aluminum dichloride, (equivalent to 0.5 mol for 1 mol of titanium tetrachloride), and 400 ml of purified neptane was added dropwise over 3 hours. The reactants were heated with stirring so that the temperature reached 65° C. after 1 hour. Stirring was continued at this temperature for 1 hour to give reduced solids. The reduced solids were separated, washed with purified heptane, and dried in vacuo at 65° C. for 30 minutes.

Then, 25 g of the reduced solids was dispersed in 100 ml of purified heptane, and to the resulting slurry was added 100 ml of solution containing 25 g of hexachloroethane (equivalent to 1 mol of hexachloroethane for 1 gram-atom of titanium in the reduced solids). Furthermore, di-n-butyl ether in an amount equivalent to 0.6 mol for 1 gram-atom of titanium in the reduced solids was added with stirring.

The mixture was heated up to 80° C. with stirring and kept at this temperature for 5 hours. Thus there was obtained the titanium trichloride catalyst component of this invention. This catalyst component was washed five times with 100 ml of purified heptane, followed by drying at 65° C. for 30 minutes. 98 mg of the catalyst component A thus obtained was sealed in a glass ampoule.

Polymerization of butene-1

In a 1.5-liter autoclave (SUS-316) equipped with a stirrer were placed under the atmosphere of nitrogen 400 ml of isobutane, 9.7 mmol of diethyl aluminum chloride, 300 ml of hydrogen, and the glass ampoule containing 98.0 mg of the catalyst component A prepared as mentioned above. While keeping the polymerization system at 30° C., the ampoule was broken by rotating the stirrer. The solids of the catalyst component were kept in contact with the solution for 5 minutes. Carbon monoxide ($4 \times 10^{-3}$ mmol) diluted with nitrogen was added. After stirring for 3 minutes, 400 ml of butene-1 was introduced, and polymerization was performed at 30° C. for 4 hours. After the polymerization was completed, unreacted butene-1 and isobutane were purged. The resulting polymer powder was dried in vacuo at 65° C. for 10 hours. There was obtained 57 g of poly(butene-1) powder having a bulk density of 0.44 g/cc.

COMPARATIVE EXAMPLE 1

Polymerization of butene-1 was performed in the same manner as in Example 1 except that carbon monoxide was not added. The amount of catalyst component A was 88.0 mg and the polymerization time was 4 hours. There was obtained 56 g of poly(butene-1). This polymer was mostly spongy and the bulk density of the particular portion was lower than 0.2 g/cc.

EXAMPLE 2

Preparation of catalyst component B

In a 200-ml four-mouth flask, with the atmosphere therein replaced with nitrogen, were placed 8.0 g of magnesium ethoxide and 45 ml of n-heptane. While stirring, a mixture of 28 g of $HSiCl_3$ and 17 ml of n-heptane was added over 45 minutes. Stirring was continued at 70° C. for 6 hours, and the resulting solids were filtered off and washed five times with 50 ml of hexane at 65° C. and then with 50 ml of toluene. 30 ml of toluene and 2.0 g of di-n-butyl phthalate were added and the reactants were heated to 50° C. 60 ml of $TiCl_4$ was added and the reactants were heated to 120° C., and stirring was continued for 2 hours at this temperature. The reactants were cooled to 90° C., and washing was repeated twice with 100 ml of toluene. 30 ml of toluene and 60 ml of $TiCl_4$ were added again, followed by stirring at 120° C. for 2 hours. The solids thus obtained were washed eight times with 100 ml of hexane at room temperature, followed by drying in vacuo. Thus there was obtained powder of catalyst component B. 33 mg of this powder was sealed in a glass ampoule.

Polymerization of butene-1

As in Example 1, in a 1.5-liter autoclave were placed 400 ml of isobutane, 2.8 mmol of triethyl aluminum, 0.14 mmol of phenyltriethoxysilane, 200 ml of hydrogen, and the glass ampoule containing 33 mg of catalyst component B. While keeping the polymerization system at 20° C., the ampoule was broken and the catalyst component was contacted with the cocatalyst for 5 minutes. Carbon monoxide ($2 \times 10^{-4}$ mmol) diluted with nitrogen was added. After stirring for 3 minutes, 400 ml of butene-1 was introduced, and the autoclave was heated to 30° C. over 10 minutes. Polymerization was performed at this temperature for 3 hours and 50 minutes. After the polymerization was completed, unreacted butene-1 and isobutane were purged. There was obtained 88 g of white poly(butene-1) powder having a bulk density of 0.30 g/cc.

COMPARATIVE EXAMPLE 2

Polymerization of butene-1 was performed in the same manner as in Example 2 except that carbon monoxide was not added. The amount of catalyst component B was 26 mg and the polymerization time was 4 hours. There was obtained 91 g of poly(butene-1). This polymer was spongy and it was difficult to measure the bulk density.

EXAMPLE 3

Preparation of catalyst component C

In a 200-ml four-mouth flask, with the atmosphere therein replaced with nitrogen, were placed 9.52 g of silica powder [G-952, a product of Davison, calcined at 200° C. for 2 hours and then at 700° C. for 5 hours in a nitrogen stream], 40 ml of 20% solution of n-butylethyl magnesium in n-heptane (MAGALA BEM, a product of Texas Alkyls Co.), and 30 ml of n-heptane, followed by stirring at 90° C. for 1 hour. The flask was cooled to 0° C. 40 ml of $Si(OC_2H_5)_4$ was added dropwise over 30 minutes, and the reactants were heated to 60° C. at which reaction was performed for 60 minutes. The resulting solids were washed three times with 50 ml of hexane at room temperature, followed by drying in vacuo at 65° C. Thus there was obtained a carrier powder. To 7.37 g of this carrier powder were added 20 ml of $HSiCl_3$, and 50 ml of n-heptane, followed by stirring at 70° C. for 1 hour. After washing three times with hexane at room temperature, 20 ml of toluene and 0.4 ml of di-n-butyl phthalate were added, followed by stirring at 50° C. for 2 hours. 30 ml of $TiCl_4$ was added and reaction was performed at 90° C. for 2 hours, followed by washing twice with 50 ml portions of toluene at 90° C. 30 ml of $TiCl_4$ and 20 ml of toluene were added again, followed by reaction at 90° C. for 2 hours. The solids were washed six times with 50 ml of hexane at room temperature, followed by drying in vacuo at 65° C. Thus there was obtained catalyst component C. 54.1 mg of catalyst component C was sealed in a glass ampoule.

Polymerization of butene-1

As in Example 1, in a 1.5-liter autoclave were placed 400 ml of isobutane, 0.93 mmol of triethyl aluminum, 0.046 mmol of phenyltriethoxysilane, 100 ml of hydrogen, and the glass ampoule containing 54.1 mg of catalyst component C. While keeping the autoclave at 30° C., the ampoule was broken and the catalyst component was contacted with the cocatalyst for 5 minutes. Carbon monoxide ($1.1 \times 10^{-4}$ mmol) diluted with nitrogen was added. After stirring for 3 minutes, 400 ml of butene-1 was introduced, and polymerization was performed at 30° C. for 4 hours. There was obtained 36 g of poly(butene-1) having a bulk density of 0.40 g/cc.

COMPARATIVE EXAMPLE 3

Polymerization of butene-1 was performed in the same manner as in Example 3 except that carbon monoxide was not added. The amount of catalyst component C was 46.1 mg and the polymerization time was 4 hours. There was obtained 38 g of poly(butene-1). It was difficult to measure the bulk density of the resulting polymer.

EXAMPLE 4

Polymerization of butene-1

As in Example 1, in a 1.5-liter autoclave were placed 400 ml of isobutane, 3.3 mmol of triethyl aluminum, 0.16 mmol of phenyltriethoxysilane, 200 ml of hydrogen, and the glass ampoule containing 39 mg of catalyst component B prepared in Example 2. While keeping the autoclave at 20° C., the ampoule was broken and the catalyst component was contacted with the cocatalyst for 5 minutes. Propadiene ($2.4 \times 10^{-4}$ mmol) diluted with nitrogen was added, followed by stirring for 3 minutes. 400 ml of butene-1 was introduced into the autoclave and the autoclave was heated to 30° C. Polymerization was performed at this temperature for 3 hours and 50 minutes. After the polymerization was completed, unreacted butene-1 and isobutane were purged. There was obtained 97 g of white powder of poly(butene-1).

What is claimed is:

1. In a process for polymerizing butene-1 in the presence of a catalyst system comprising (1) a titanium halide containing catalyst component and (2) an organoaluminum cocatalyst, the improvement comprising bringing said catalyst component into contact at a concentration in the range of about 0.0001 to 0.01 gram-mol for 1 gram-atom of titanium in the catalyst component with propadiene as an activity inhibitor either (i) prior to contact with the organoaluminum cocatalyst, or (ii) after said catalyst component and organoaluminum cocatalyst have been mixed, and thereafter, in the range of from room temperature to 45° C., slurry homopolymerizing butene-1 or copolymerizing with ethylene or an alpha-olefin in an amount of 10% or less.

2. The process as in claim 1 wherein the titanium halide containing catalyst component is obtained by reducing titanium tetrachloride with one of hydrogen, aluminum, or an organometallic compound selected from organo compounds of Groups I-III of the Periodic Table to yield titanium trichloride or a complex thereof, and treating the titanium trichloride or its complex with an activating agent selected from one of an electron donor, halogen element or halogen-containing compound or mixtures thereof.

3. In a process for polymerizing butene-1 in the presence of a catalyst system comprising (1) a titanium halide containing catalyst component and (2) an organoaluminum cocatalyst, the improvement comprising bringing said catalyst component into contact with propadiene as an activity inhibitor either (i) prior to contact with the organoaluminum cocatalyst, or (ii) after said catalyst component and organoaluminum cocatalyst have been mixed, and thereafter, in the range of from room temperature to 45° C., slurry homopolymerizing butene-1 or copolymerizing with ethylene or an alpha-olefin in an amount of 10% or less wherein the titanium halide containing component is obtained by contacting (1) metallic magnesium or a magnesium compound represented by the formula $MgR_n^1R_{2-n}^2$, wherein $R^1$ and $R^2$ are the same or different hydrocarbon groups, $OR^3$ groups, OH groups, or halogen atoms, and wherein $R^3$ is a hydrocarbon group which is the same or different from $R^1$ and $R^2$, and $0 \leq n \leq 2$ and (2) a titanium halide compound, (3) an activating agent selected from electron donor compounds, halogen elements, halogen-containing compounds, or an organoaluminum compound and the activity inhibitor concentration is in the range of 0.001 to 1 gram-mol per 1 gram-atom of titanium in the catalyst component.

4. The process as in claim 3 wherein the titanium containing catalyst component is prepared in the presence of a metal oxide selected from $B_2O_3$, MgO, $Al_2O_3$, $SiO_2$, CaO, $TiO_2$, ZnO, $ZrO_2$, $SnO_2$, BaO, $ThO_2$, $SiO_2$-MgO, $SiO_2$-$Al_2O_3$, and $SiO_2$-$TiO_2$.

5. The process as in claim 1 comprising homopolymerizing butene-1.

6. The process as in claim 1 comprising copolymerizing butene-1 with a small amount of ethylene and/or another alpha-olefin.

* * * * *